Aug. 13, 1929.                    H. T. FAUS                    1,724,833
METER COMPENSATING DEVICE
Filed April 24, 1928
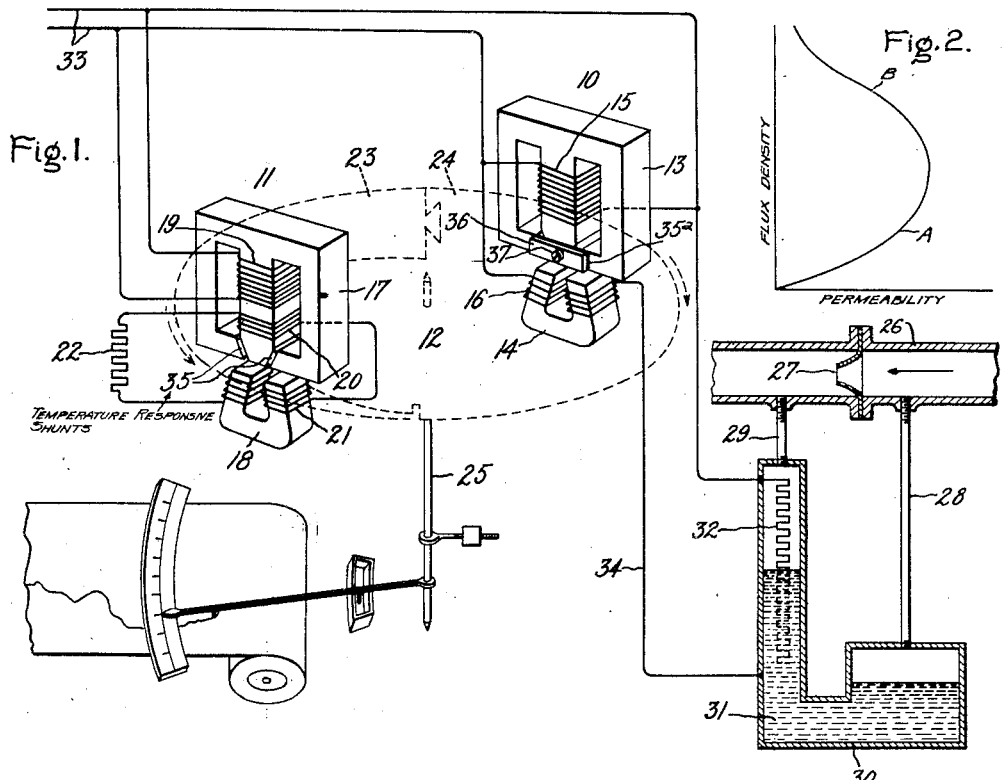
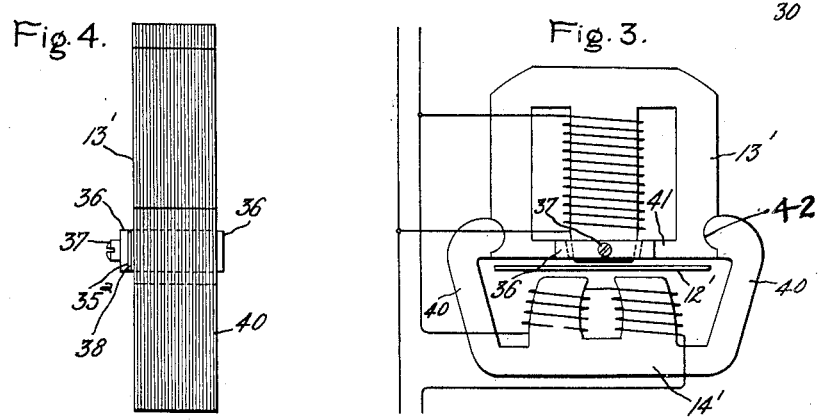
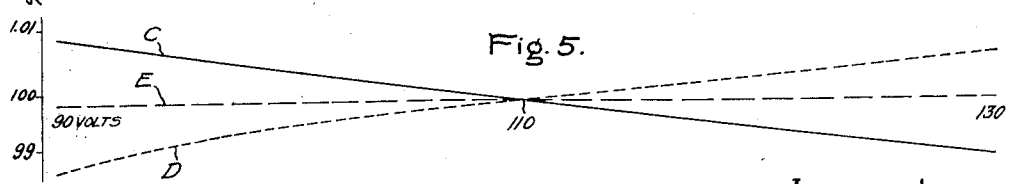
Inventor:
Harold T. Faus,
by Charles E. Muller
His Attorney.

Patented Aug. 13, 1929.

1,724,833

UNITED STATES PATENT OFFICE.

HAROLD T. FAUS, OF LYNN, MASSACHUSETTS, ASSIGNOR TO GENERAL ELECTRIC COMPANY, A CORPORATION OF NEW YORK.

METER COMPENSATING DEVICE.

Application filed April 24, 1928. Serial No. 272,494.

My invention relates to electric meters of the induction type and its object is to compensate such meters for certain temperature and voltage errors peculiar to meters of this type and by this I mean to include induction meter elements whenever employed, for example, those employed in induction disc relays and small constant speed induction disc motors. Broadly the invention comprises two types of compensation, namely a temperature compensation and a voltage compensation. In certain applications the voltage compensation is made necessary by a voltage error which is created when the temperature compensation is applied so that in such cases the two kinds of compensation are combined to correct for temperature errors. In other cases either type of compensation may be used alone with beneficial results.

The features of my invention which are believed to be novel and patentable will be pointed out in the claims appended hereto. For a better understanding of my invention I will explain in connection with Fig. 1 how the two types of compensation have been employed to eliminate temperature errors in an induction type electric flow meter and, in connection with Fig. 3, how the voltage compensation is employed alone to improve the accuracy of integrating induction wattmeters. Fig. 2 represents a flux-permeability curve of silicon steel to be referred to in explaining the voltage compensation. Fig. 4 is a side view of the meter shown in Fig. 3 to more clearly show how the voltage compensating feature is applied to the meter; and Fig. 5 are voltage accuracy curves taken from test data representing different effects of the voltage compensation on the integrating type wattmeter.

Referring to the drawings and more particularly to Fig. 1 I have here represented a recording flow meter of the induction type which is described and claimed in United States Patent 1,659,549, February 14, 1928, to Kinnard and Pratt and to which the compensating features of the present invention have been applied.

This is a ratio instrument comprising two induction meter elements 10 and 11 acting in opposition upon an armature 12 of conducting material so arranged as to vary the torque ratio for different positions of the armature. The armature is mounted at its center upon a suitable shaft 25. The meter element 10 comprises a potential electromagnet 13 and a current electromagnet 14, the coils of which are indicated by numerals 15 and 16, respectively. This element is similar to a well known type of induction wattmeter element, and the joint fluxes produced by the two electromagnets thereof act upon the disc armature 12 to produce a torque in the direction indicated by the arrow adjacent thereto. At a given power factor, this torque is proportional to EI where E represents the voltage applied to the potential coil and I the current flowing in the current coils.

The induction meter element at 11 is arranged in this instance to produce a torque proportional to $E^2$ and comprises electromagnets 17 and 18. The core members of these electromagnets are substantially similar to those at 13 and 14, but the coil of 18 is energized in a different manner. The electromagnet 17 has a primary potential winding 19 thereon and a secondary winding 20, and serves the additional purpose of a transformer. This secondary winding is connected in series with a winding 21 on the core of electromagnet 18.

The arrangement makes the fluxes of both electromagnets 17 and 18 proportional to the voltage E applied to winding 19 and the transformer arrangement produces the necessary phase relation between these fluxes so as to produce a torque on the armature proportional to $E^2$. A resistance 22 is preferably included in the circuit of coils 20 and 21 to make the current in coil 21 more nearly of the desired phase.

The armature is made up of two parts 23 and 24 of irregular shape but keyed together and forming a continuous circular balanced disc armature. The part 23 is in this instance made of higher resistance than the part 24; for example, part 23 may be made of a nickel silver alloy and the part 24 of copper.

In the present arrangement the disc is positioned so that the part 23 has its normal range of movement opposite torque element 11 and so that the torque element 10 acts entirely on the lower resistance part 24. The high resistance part 23 has the general shape of a curved horn, as shown, with an outer curvature of a true circle corresponding to the curvature of the circular disc, so that as the disc is rotated with respect to element 11, the resistance of the armature acted upon thereby varies from a maximum when the large portion of the part 23 is opposite element 11, to a minimum when the small portion of part 23 is opposite element 11. In the first position mentioned the fluxes of element 11 act entirely, or practically so, on the high resistance part 23, and the torque thereof for a given voltage E is comparatively low, and in the last mentioned position the fluxes of element 11 act entirely or substantially so on the lower resistance part 24, and the torque thereof for the same voltage E is materially increased. At intermediate positions the torque has corresponding intermediate values, since the element 11 acts to a varying extent upon both parts of the armature. Thus the torque of element 11 varies with $E^2$ and the position of the armature. Element 10 always acts upon the low resistance part 24 of the armature within the normal range of movement, so that its torque is always proportional to EI. The two torques act in opposition so that a condition of equilibrium will exist when the torque of element 11 represented by $E^2D$, where D is a variable depending upon the deflection, equals the torque of element 10 represented by EI. Thus the deflection D is proportional to $$\frac{EI}{E^2} = \frac{I}{E}.$$

The instrument of Fig. 1 is arranged to measure the flow of fluid in a conduit 26. The conduit contains a pressure creating nozzle 27, and the leading and trailing sides of this nozzle are connected by pipes 28 and 29 to the upper ends of a U tube or chamber 30. It is seen that when flow exists in the conduit in the direction of the arrow therein, a greater pressure will exist in tube 28 than in tube 29, which pressure difference will be proportional to the rate of flow. The high pressure leg of the U tube is larger in area than the low pressure leg, but is not so long. The well formed between the two legs contains a conducting liquid such as mercury 31, so that as a pressure difference is created, due to the flow of the fluid in conduit 26, the mercury lowers in the high pressure leg and rises in the low pressure leg. The low pressure leg contains a resistance element 32 arranged to be connected in series relation with the current coils 16 of the torque element 10 and the source 33 which supplies all of the coils of the instrument either directly or indirectly. When no flow exists, the mercury is at the same level in both legs, and is preferably just out of contact with the lower extremity of resistance element 32. At this time, torque element 11 will rotate the armature to a zero indicating position. The wire 34 between the current coils 16 and the chamber 30 is connected to the metallic surface of the chamber so that it is always in electrical contact with the mercury. As the mercury rises in the low-pressure leg, it first completes the electric circuit of coils 16 and then decreases the resistance in this circuit. At a given voltage E of source 33 the current I in this circuit is proportional to the rate of flow. If the voltage E varies, the current I will vary accordingly for a given rate of flow. Consequently, the conductance of this circuit is proportional to $\frac{I}{E}$ which, as shown above, is the same as the law of deflection of the ratio instrument comprising elements 10, 11 and 12. Consequently the instrument may be calibrated to indicate, or record, or both indicate and record, the rate of flow in conduit 26 and is independent of wide variations in voltage of the alternating current source 33.

As pointed out in the patent referred to herein it is possible to reduce the temperature error of the meter somewhat by making the resistance 22 of a material having a zero temperature coefficient of resistance. However, in spite of this expedient the meter still has an undesirable temperature error due primarily to the change in resistance of coils 20 and 21 with changes in temperature. This error is compensated by means of the present invention by inserting temperature responsive magnetic wedges 35 in the air gaps between the middle leg and the two outer legs of the E-shaped core member 17. These wedges completely fill the air gaps and are preferably driven in with a tight fit so as to require no additional supporting means. These wedges, or shunts as they may be called, are made of a material having a negative temperature coefficient of permeability and the particular material which I have used for this purpose is an alloy comprising approximately 68 parts nickel, 30 parts copper and 2 parts iron prepared in accordance with the teachings of United States Patent No. 1,706,172, March 19, 1929, entitled "Temperature responsive magnetic materials", assigned to the same assignee as the present invention. Such material may be prepared for example by mixing the metals together in the proportions mentioned while in the molten state, casting in green sand molds, and quenching in water as soon as the alloys solidify. With this, or equivalent, material in the air gap of magnet 17 the torque producing strength of the flux of this magnet varies directly with the temperature and compensates for the decrease in torque caused by the change in resistance of coils 20 and 21 with changes in temperature. The presence of these magnetic shunts causes the reluctance of the air gap in which they are placed to increase with temperature thereby forcing a greater proportion of the flux toward the disc.

However, this compensating feature changes the characteristics of element 11 in another way. For a given magnet at 17 the presence of the shunts 35 decreases the torque producing flux thereof to a certain extent at all usual operating temperatures. The permeability of the shunts is very much lower than that of the core material even at the lowest operating temperatures and at a constant temperature the rate of change of permeability with flux changes caused by variations in voltage is not the same in the two materials.

Due to these conditions the torque characteristics of element 11 with changes in voltage is somewhat different than before the shunts were inserted. The increase in torque with voltage is now too large and the element 11 does not give sufficient torque at low voltages or gives too great a torque at high voltages. This voltage error is compensated for by producing a similar voltage error in element 10 or by modifying the characteristics of the counter torque element 10 so that the two elements 10 and 11 will be similarly influenced by changes in voltage, but so that element 11 alone will be particularly influenced by changes in temperature in the manner described. This is accomplished by shunting flux across the corresponding air gaps of magnet 13 by means of a shunt located at 35$^a$ which is non-responsive to temperature changes but which changes the torque characteristics of element 10 in the same relation as element 11 is changed due to voltage variations. This shunt comprises a thin strip of magnetic material such as silicon steel indicated at 35$^a$ in Figs. 1 and 4. It is held in place by non-magnetic strips 36 and bolt 37. The correct amount of shunting is preferably obtained by inserting a strip of paper 38 between shunt 35$^a$ and the core of magnet 13. This provides small air gaps between the piece 35$^a$ and the core proper which, by changing the thickness of the non-magnetic paper shim, may be accurately adjusted to obtain just the right degree of shunting. Due to the peculiar voltage characteristics of element 17 the amount of flux to be shunted by strip 35$^a$ should not be exactly proportional to the voltage but should vary at a lesser rate. This result is accomplished by taking advantage of the change of permeability of magnetic material at different flux densities.

The flux density-permeability curve of silicon steel below saturation is represented in Fig. 2. The flux density of the core 13 is such that it operates over the lower portion of the curve of Fig. 2 in the neighborhood of point A where an increase in flux, such as is caused by an increase in voltage, increases the permeability. The shunt 35$^a$ is proportioned in cross-section and by the air gaps between it and the core proper so that it operates at a higher flux density corresponding to about point B where an increase in flux causes a decrease in permeability. As a result of this relation the amount of flux shunted increases at a lesser rate than the total flux of the magnet 13 when the voltage increases so that the torque flux which is forced toward the disc 12 varies in the same relation as that in element 17 with variations in voltage and the voltage error of the meter incidentally caused by the temperature compensation is thus eliminated.

The voltage compensating feature may be applied to any similar magnet where it is desired to compensate for an effect which tends to make the meter torque too low as the voltage of the potential magnet is increased. In Fig. 3 it is applied to an integrating induction meter of the type described in copending application of Isaac F. Kinnard, Serial No. 151,292, filed November 29, 1926, and assigned to the same assignee as the present invention.

In this type of meter there are two parallel flux paths for the potential flux, one path across the air gaps in the E-shaped potential magnet 13′ and the other path through the main air gap including the disc 12′, the current core 14′ and the side members 40.

The two parallel paths are so proportioned as to take advantage of the change in permeability of the magnetic material employed to correct for the errors caused by variations in voltage. In such a meter the air gaps and cross-section of the magnetic paths are chosen so that the flux through the disc varies at a greater rate than the first power of the voltage. This is accomplished by operating the parts 40 over the lower part of the flux-permeability curve and the parts 41 over the upper part of the flux permeability curve as described in detail in the application last referred to.

To consistently obtain the results desired the magnetic material must not only be of a uniform grade, but the air gap dimensions must be kept fairly exact. Irregularities in the joints at 42 caused by wear in the dies may change the characteristics. The voltage compensating shunt of the present invention is utilized to obtain accurate proportioning of the parallel magnetic paths where, due to one reason or another, such could not be obtained by the available laminations. This is illustrated by the voltage-accuracy curves of Fig. 5. These curves were obtained by operating a 110 volt induction test watthour meter at 100% load current and unity power factor over a voltage range from 90 to 130 volts. Curve C was obtained without any shunt at 36. At normal voltage the meter is correct but at 90 volts it ran nearly one per cent too fast and at 130 volts about one per cent too slow. A shunt arranged similar to that shown at 35ª Fig. 4, was then used with paper shims of .01 inches in thickness placed at 38 between the shunt and the core 13'. This gave the results of curve D showing that the effect of shunt 35ª was too great. The paper shims were then increased to a thickness of .04 inches and the results shown in curve E were obtained which is substantially accurate over the entire voltage range. This illustrates the ease of accurately compensating such meters for voltage errors if for any reason when the meter comes up to test it is found to have an error such as is represented by curve C, Fig. 5. This compensation is easily applied and adjusted after the meter is assembled and eliminates, in many cases, the necessity of discarding meters or meter laminations which could otherwise not be used except at the sacrifice of accuracy.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:—

1. In an electric measuring device of the induction type, a movable armature of conducting material, a pair of cooperating electromagnets for producing induction torque fluxes in said armature, energizing windings on said electromagnets, a secondary winding on one electromagnet connected to the energizing winding on the other electromagnet, said windings having a resistance which increases as the temperature increases, and means for compensating for such changes in resistance comprising a temperature responsive magnetic shunt for one of said electromagnets which tends to divert more of the flux of such electromagnet toward said armature as the temperature increases.

2. In an electric measuring device of the induction type, a movable disc armature, an E-shaped electromagnet and a U-shaped electromagnet with their open ends facing each other on opposite sides of said disc, so as to produce torque fluxes in said disc, a voltage energizing winding on the middle leg of the E-shaped electromagnet, a secondary coil on said leg, an energizing winding on the U-shaped electromagnet energized from said secondary coil, said device having a temperature error due to the increase in resistance of said windings as the temperature increases and means for compensating for such temperature error comprising magnetic shunts having negative temperatures coefficients of permeability inserted in the air gaps of the E-shaped electromagnet.

3. In an induction type meter device, an induction disc armature member, an electromagnet having legs extending toward said disc for producing torque fluxes therein, and means for increasing said torque fluxes in response to an increase in temperature comprising blocks of magnetic material having negative temperature coefficients of permeability inserted between the legs of said electromagnet adjacent the disc.

4. A ratio measuring instrument of the induction type comprising an armature of conducting material, a pair of induction meter electromagnetic elements acting in opposition on said disc, both of said elements having voltage electromagnets energized from the same source, temperature compensating means for one of said elements which, in compensating for temperature errors, produces a voltage error in its voltage electromagnet, and means, non-responsive to temperature changes, for producing a similar voltage error in the voltage electromagnet of the other element.

5. A ratio measuring instrument comprising two induction meter elements acting in opposition on the same armature member, said elements having E-shaped voltage electromagnets energized from the same source so as to make the operation of said instrument independent of changes in the voltage of such source, means for compensating said instrument for temperature errors comprising shunts having negative temperature coefficients of permeability placed in the air gaps of one of said E-shaped electromagnets, the presence of such shunts producing in addition to the temperature compensation, a voltage error in the instrument, and means for compensating for such voltage error comprising magnetic shunts placed across the air gaps of the other E-shaped electromagnet, said last mentioned shunts being non-responsive to temperature changes but being similar to the temperature responsive shunts in responsiveness to changes in the voltage flux.

6. In an induction meter, an armature of conducting material, a current electromagnet, and a voltage electromagnet for producing, by their joint action, torque fluxes in said armature, and means for modifying the amount of torque producing flux contributed by the voltage electromagnet in response to changes in its exciting voltage comprising a magnetic shunt for said electromagnet positioned adjacent the armature and operating below saturation over a flux density range where its permeability decreases with an increase in flux density.

7. In an induction meter an armature of conducting material, an E-shaped voltage electromagnet with its open ends facing the armature for producing torque fluxes therein, and means for modifying such torque producing fluxes in response to changes in the exciting voltage of said electromagnet comprising a shunt of magnetic material placed across the open ends of said electromagnet but spaced therefrom by non-magnetic shims, said shunt being proportioned and positioned to operate below saturation in a flux density range where its permeability decreases with an increase in flux.

8. In an induction meter, an armature of conducting material, a voltage electromagnet having a silicon steel E-shaped core with its open ends facing the armature for producing torque fluxes therein, a magnetic shunt of silicon steel placed across the open ends of said E-shaped core, but spaced therefrom by paper shims to adjust the amount of flux shunted, the shunt being proportioned with respect to the electromagnet core so that under normal excitation the core is operating in a flux density range below saturation where its permeability increases with an increase in flux density and the shunt is operating over a flux density range below saturation where its permeability decreases with an increase in flux density.

In witness whereof, I have hereunto set my hand this 20th day of April, 1928.

HAROLD T. FAUS.